(12) United States Patent
Kim et al.

(10) Patent No.: US 8,659,594 B2
(45) Date of Patent: Feb. 25, 2014

(54) METHOD AND APPARATUS FOR CAPTURING MOTION OF DYNAMIC OBJECT

(75) Inventors: Ho-Won Kim, Seoul (KR); Seong-Jae Lim, Gwangju (KR); Han-Byul Joo, Daejeon (KR); Hyun Kang, Daejeon (KR); Bon-Ki Koo, Daejeon (KR); Chang-Woo Chu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 455 days.

(21) Appl. No.: 12/970,561

(22) Filed: Dec. 16, 2010

(65) Prior Publication Data

US 2011/0148875 A1 Jun. 23, 2011

(30) Foreign Application Priority Data

Dec. 18, 2009 (KR) ........................ 10-2009-0126716

(51) Int. Cl.
*G06T 15/00* (2011.01)

(52) U.S. Cl.
USPC ......................................... 345/419; 345/424

(58) Field of Classification Search
USPC ................................... 345/419, 424
See application file for complete search history.

(56) References Cited

U.S. PATENT DOCUMENTS

2008/0031512 A1  2/2008  Mundermann et al.

FOREIGN PATENT DOCUMENTS

JP    2007-315968    12/2007
KR  10-2007-0057613   6/2007

OTHER PUBLICATIONS

Daniel Vlasic, et al., "Articulated Mesh Animation from Multi-View Silhouettes," ACM Transactions on Graphics, vol. 27, No. 3, 2008.
Edilson De Aguiar, et al., "Performance Capture from Sparse Multi-View Video," IEEE Conference on Computer Vision and Pattern Recognition, 2008.
Juergen Gall et al., "Drift-Free Tracking of Rigid and Articulated Objects," IEEE Conference on Computer vision and Pattern Recognition, 2008.
Juergen Gall et al., "Motion Capture Using Joint Skeleton Tracking and Surface Estimation," IEEE Conference on Computer Vision and Pattern Recognition, 2009.

*Primary Examiner* — Maurice L McDowell, Jr.
(74) *Attorney, Agent, or Firm* — Staas & Halsey LLP

(57) ABSTRACT

The present invention relates to a method and apparatus for capturing a motion of a dynamic object, and restore appearance information of an object making a dynamic motion and motion information of main joints from multi-viewpoint video images of motion information of a dynamic object such as a human body, making a motion through a motion of a skeletal structure on the basis of the skeletal structure, acquired by using multiple cameras. According to the exemplary embodiments of the present invention, it is possible to restore motion information of the object making a dynamic motion by using only an image sensor for a visible light range and to reproduce a multi-viewpoint image by effectively storing the restored information. Further, it is possible to restore motion information of the dynamic object without attaching a specific marker.

17 Claims, 8 Drawing Sheets

FIG. 8
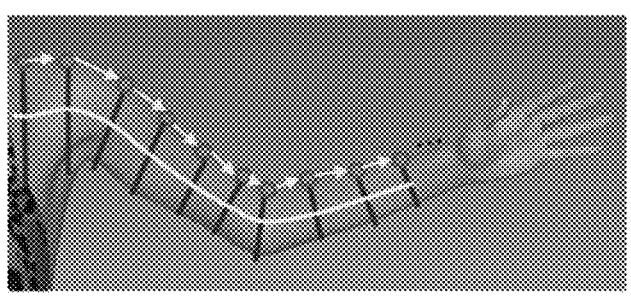 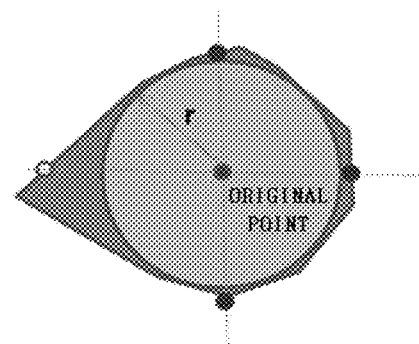

JOINTS HAVING VISIBILITY IN MULTI-VIEWPOINT IMAGE

METHOD AND APPARATUS FOR CAPTURING MOTION OF DYNAMIC OBJECT

CROSS REFERENCE TO RELATED APPLICATIONS

This application claims priority to Korean Patent Application No. 10-2009-0126716 filed on Dec. 18, 2009, the entire contents of which are herein incorporated by reference.

BACKGROUND OF THE INVENTION

1. Field of the Invention

The present invention relates to a method and apparatus for capturing a motion of a dynamic object, and more particularly, to a method and apparatus for capturing a motion of dynamic object which restore appearance information of an object making a dynamic motion, and motion information of a main joint by only an image sensor for a visible light range.

2. Description of the Related Art

General techniques for capturing appearance and motion information of an object making a dynamic motion are being performed on human bodies and can be generally classified into two kinds.

First, there is a method for capturing a dynamic motion of an object by scanning static appearance information of the object by using an active sensor for a laser or pattern light, capturing a joint motion by attaching markers to parts of the object having a great dynamic effect and tracking the markers, and manually combining two kinds of information by a designer.

This method is actually used a lot for high-quality special effects in image contents such as films or commercial films; however, there is a drawback in which, in order to combine information obtained by different kinds of sensors, a lot of manual labor of skilled designers and artists and a large amount of model generating time are required.

Scanned static appearance information has a shape different from a mesh structure used for expressing a dynamic motion as in FIG. 3, but it is not appropriate for generating a smooth motion because of excessive capacity and a random structure. Therefore, it is inevitable to go through a process of regenerating a mesh structure to easily construct animation on the basis of appearance information scanned by manual labor. In this process, in order to preserve behavioral characteristics of an actual dynamic object, a lot of tuning work is required. Further, a rigging process which is an animation connection process between a skeletal structure of a dynamic object and individual vertexes constituting a mesh structure assigns the captured motion information to a joint of the skeletal structure and is tuned by repeated manual labor until the appearance information modified at that time copies the appearance of the dynamic object as it is. However, there is an advantage in which, once a 3D model of the dynamic object is made, animation of a new motion or appearance edit and correction are easy.

Another technique group relates to methods of capturing appearance information and motion information of a dynamic object making a dynamic motion by using multi-viewpoint images of the dynamic object acquired from various viewpoints. In detail, there exist approaches according to whether an initial model is used, a model initialization method, an application range of multi-viewpoint image information, restoration priorities of an appearance and a motion, and a method of modifying the appearance of a model.

The trends of theses and dissertations are taking the approach of restoring appearance and motion information of a dynamic object by a method of modifying the appearance of the dynamic object by generating a unique body model of a dynamic object from a multi-viewpoint image of a 3D scanner or a main frame and applying the generated model of the dynamic object to each frame in order to minimize a projection error between multi-viewpoint silhouette information of each frame and multi-viewpoint silhouette information obtained by projecting the model of the dynamic object to each camera. However, it has been reported that, even though multi-viewpoint silhouette information is used, the information has a limit in expressing appearance information of a dynamic object making a dynamic motion, and in order to solve those problems, various correction methods based on user GUI has been suggested.

In a case of a 3D scanning method, there exists a limit in which unique modification features of the appearance, which do not appear when the initial model of the dynamic object, is not properly restored because of limitations in a local-shape modification method based on a mesh used to modify the appearance of the dynamic object.

In a case of a multi-viewpoint image technique, there is a drawback in which, since a modification of an appearance of a dynamic object according to the motion of each frame is restored by using appearance information of an initial model of the dynamic object, the multi-viewpoint image technique is highly dependent on the degree of precision of the appearance of the initial model of the dynamic object.

SUMMARY OF THE INVENTION

The present invention has been made in an effort to provide a method and apparatus for capturing a motion of a dynamic object which restore appearance information of the object, making a dynamic motion, and motion information of a main joint by using only an image sensor for a visible light range.

Further, the present invention has been made in an effort to provide a method and apparatus for capturing a motion of a dynamic object which are capable of restoring motion information of a dynamic object without attaching a specific marker.

An exemplary embodiment of the present invention provides a method for capturing a motion of a dynamic object including: generating a 3D model of the dynamic object based on the anatomic features of the dynamic object and multi-viewpoint video images of a motion of the dynamic object; restoring geometric appearance information of the 3D model with respect to the motion of the dynamic object from each frame of multi-viewpoint images extracted from the multi-viewpoint video images; approximating a 3D skeleton with respect to the motion of the frame by using visibility information of each voxel constituting a visual hull obtained from the geometric appearance information of the restoring; receiving the approximated skeleton information and 3D model information of the dynamic object to estimate a posture of the 3D model on the basis of position information of individual joints constituting a skeletal structure of the 3D model in the corresponding frame; and estimating the shape of the 3D model by comparing a multi-viewpoint composite image, generated by projecting appearance information of a geometric mesh structure modified on the basis of posture information of the skeletal structure to the multi-viewpoint image, with the multi-viewpoint image and calibrating the geometric appearance information according to an error therebetween.

The 3D model may include a mesh structure expressing a geometric appearance and a texture map expressing a photometric appearance, a skeletal structure constructed on the basis of anatomic information of the dynamic object, and a muscle structure subordinate to the skeletal structure.

The 3D model may maintain a shape on the basis of the skeletal structure of the dynamic object, and make a modification in the shape and a motion through rotations of inferior joints constituting the skeletal structure and contraction and relaxation of the muscle structure expressed on the basis of anatomy between joints.

The approximating the skeleton may include projecting the restored geometric appearance information to the multi-viewpoint image, performing sampling at predetermined intervals along a tangent line of a 2D silhouette of the multi-viewpoint image to which the geometric appearance information has been projected, and extracting 3D voxels intersecting with the 2D silhouette, generating a 3D cross-section including the extracted 3D voxels and intersecting with restored appearance information at the shortest distance, and generating the skeleton by connecting the centers of gravity of the 3D voxels intersecting with the generated 3D cross-section.

The estimating the posture may further include estimating a joint position corresponding to each joint of the 3D model by approximating a skeleton curve restored in a current frame to a 3D polygon line maintaining a joint length by using inter-joint length information of the 3D model and posture information on the skeletal structure of the 3D model restored in the previous frame of the current frame being subject to restoration.

The estimating the posture may include calculating a Jacobian matrix on the basis of whole body inverse kinematics by using joints, having visibility in the multi-viewpoint image, of joints constituting the skeletal structure of the 3D model and joint position information on the skeleton corresponding thereto, and estimate posture information of all joints of the 3D model including joints having no visibility by using the Jacobian matrix.

In the calculating of the Jacobian matrix, the whole body inverse kinematics calculates Jacobian matrix with respect to joint motions of a whole body by using all 3D corresponding points having visibility in three points or more multi-viewpoint images with respect to each end effector in reference to a root of forward kinematics of the dynamic object.

The estimating the posture may further include estimating whole body joint motions to minimize differential vectors of the 3D corresponding points while maintaining the restriction condition of an anthropometric joint rotation angle.

The estimating the shape may include classifying appearance information of the 3D voxels restored according to part information of the dynamic object, estimating 2D silhouette information lost by self-occlusion by extracting color edge information, close to the boundary of part information projected to the multi-viewpoint image and included in image having similar normal line information, and modifying the shape to minimize a silhouette error of the multi-viewpoint image.

The estimating the shape may further include estimating a position of a vertex maximally ensuring the curved surface information of a unique tangent line direction of each vertex while minimizing the color error by generating radiation lines from the central point of the 3D cross-section including vertexes of the mesh structure of the 3D model to the vertexes, and performing template matching to the boundary of the 3D visual hull along the radiation lines projected to the multi-viewpoint image having visibility.

The estimating the shape may include controlling a posture by rotations of joints constituting the skeletal structure, performing contraction and relaxation of muscles connected to the skeletal structure on the basis of the posture information, modifying a global shape of a sweep surface parametrically expressed by the posture information of the skeletal structure, modifying a local shape of the sweep surface connected to the muscles by the contraction and relaxation of the muscles, and modifying a surface of each vertex of a mesh structure connected to the sweep surface.

The method for capturing a motion of a dynamic object may further include storing motion information including at least one of a residual error of shape estimation in the estimating the shape, the posture information of the skeletal structure, a texture map restored from the multi-viewpoint image, and control parameter values.

The method for capturing a motion of a dynamic object may further include reproducing the multi-viewpoint image of the each frame on the basis of the motion information stored in the storing the motion information.

Another exemplary embodiment of the present invention provides an apparatus for capturing a motion of a dynamic object including: a 3D model generator generating a 3D mode of the dynamic object on the basis of anatomic features of the dynamic object; an appearance information restoring unit restoring geometric appearance information of the 3D model with respect to a motion of the dynamic object from each frame of multi-viewpoint images extracted from multi-viewpoint video images; a skeleton approximating unit approximating a 3D skeleton with respect to a motion of the frame from the geometric appearance information; a posture estimating unit estimating a posture of the 3D model on the basis of position information of individual joints constituting a skeletal structure of the 3D model in the corresponding frame; and a shape estimating unit estimating a shape of the 3D model according to an error between the multi-viewpoint image and a multi-viewpoint composite image generated by projecting appearance information of a geometric mesh structure modified on the basis of posture information of the skeletal structure.

The apparatus for capturing a motion of a dynamic object may further include a parametric controller expressing a motion of an appearance of the dynamic object by modifying the mesh structure corresponding to a motion of the skeletal structure.

The apparatus for capturing a motion of a dynamic object may further include a storage unit storing motion information including at least one of a residual error of shape estimation, the posture information of the skeletal structure, a texture map restored from the multi-viewpoint image, and control parameter values.

The apparatus for capturing a motion of a dynamic object may further include a reproducer reproducing the multi-viewpoint image of the each frame on the basis of the motion information stored in the storage unit.

According to the exemplary embodiments of the present invention, it is possible to minimize a 3D directional error component with respect to a 3D position of each vertex of a 3D model restored through a shape estimation process and a 3D position of each vertex of a 3D model modified by a parametric controller by changing control parameters of muscles and a sweep model.

Further, it is possible to store texture map information obtained by using posture information of a skeletal structure estimated through a posture estimation process, parameter information of a parametric controller, a residual 3D directional error component remaining in the shape estimation process, and visibility of a multi-viewpoint image regarding restored appearance information and to reproduce a multi-viewpoint image of a corresponding frame by using minimum stored information.

Furthermore, it is possible to restore motion information of a dynamic object without attaching a specific marker.

BRIEF DESCRIPTION OF THE DRAWINGS

FIG. 8 is an exemplary view illustrating referred to for explaining a skeleton approximating process;

DETAILED DESCRIPTION OF THE PREFERRED EMBODIMENTS

Hereinafter, restoring a 3D appearance and motion of an object making a dynamic object using a multi-viewpoint camera according to exemplary embodiments of the present invention will be described in detail with reference to the accompanying drawings.

A dynamic object that is a subject of exemplary embodiments of the present invention maintains a shape on the basis of a skeletal structure, and a restoration subject of exemplary embodiments of the present invention is a living being such as a human body, a dog, and a cat that makes a shape modification and a motion through rotation of inferior joints constituting the skeletal structure, and contraction and relaxation of a muscle structure expressed on the basis of anatomy between joint.

Exemplary embodiments of the present invention relate to an apparatus and method for capturing an actual motion of a dynamic object geometrically and photographically without using a series of markers by receiving a multi-viewpoint video image of a dynamic object, which is obtained from multiple cameras distributed around the dynamic object, and a 3D model constructed on the basis of anatomy information of the dynamic object and restoring appearance and motion information for each frame of the dynamic object.

Figure 1:
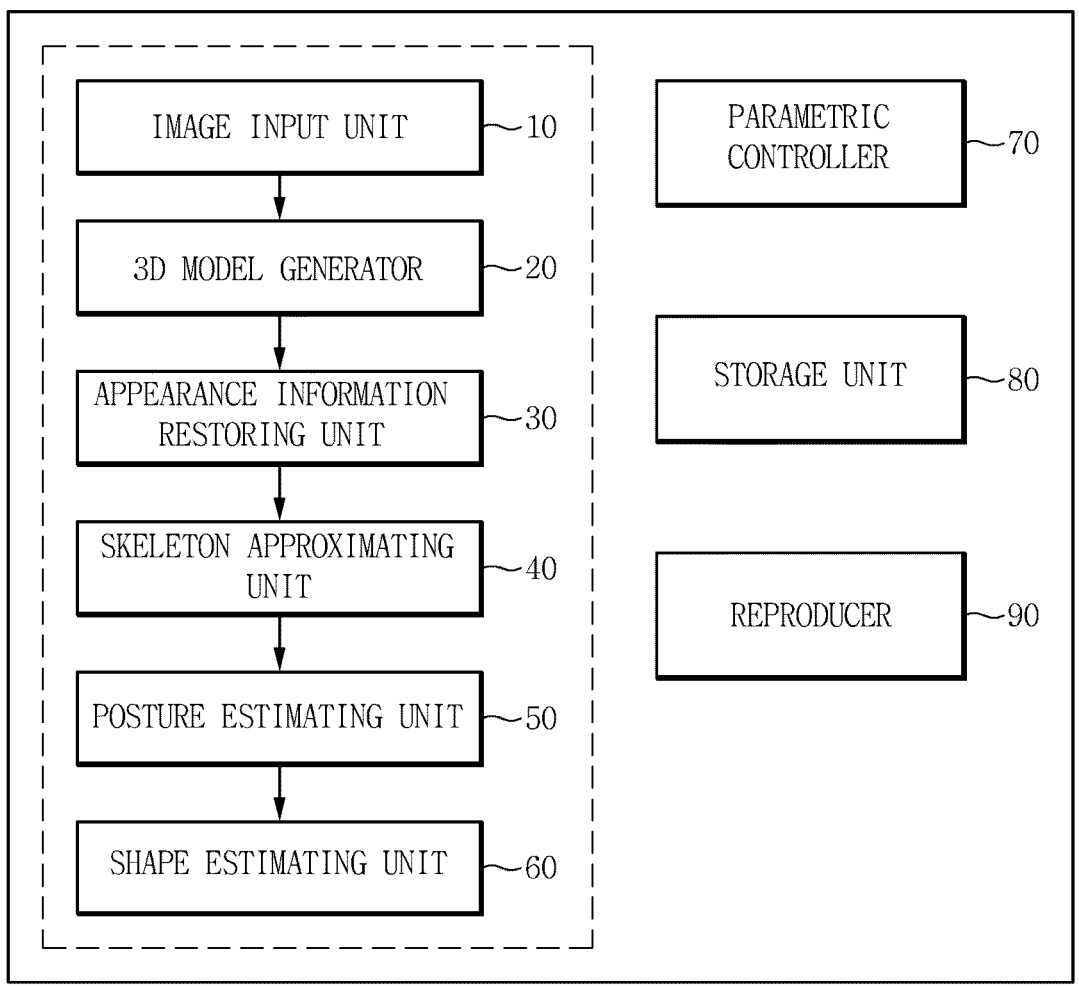
FIG. 1 is a block diagram for explaining a configuration of an apparatus for capturing a motion of a dynamic object according to an exemplary embodiment of the present invention.

First, FIG. 1 is a block diagram for explaining a configuration of an apparatus for capturing a motion of a dynamic object according to an exemplary embodiment of the present invention.

As shown in FIG. 1, an apparatus for capturing a motion of a dynamic object according to an exemplary embodiment of the present invention includes an image input unit 10, a 3D model generator 20, an appearance information restoring unit 30, a skeleton approximating unit 40, a posture estimating unit 50, a shape estimating unit 60, a parametric controller 70, a storage unit 80, and a reproducer 90.

The image input unit 10 is a means to which multi-viewpoint video image of a motion of a dynamic object acquired is input.

The 3D model generator 20 generates a 3D model regarding the dynamic object on the basis of the anatomic features of the dynamic object and multi-viewpoint video images of the motion of the dynamic object acquired.

The appearance information restoring unit 30 restores geometrical appearance information of the 3D model regarding the motion of the dynamic object from each frame of the multi-viewpoint images extracted from the multi-viewpoint video images.

The skeleton approximating unit 40 approximates a 3D skeleton regarding a motion of the frame by using visibility information of each voxel constituting a visual hull obtained from the geometric appearance information restored by the appearance information restoring unit 30.

The posture estimating unit 50 receives information on the approximated skeleton and information on the 3D model of the dynamic object and estimates the posture of the 3D model on the basis of position information of individual joints constituting the skeletal structure of the 3D model in a corresponding frame.

The shape estimating unit 60 compares a multi-viewpoint composite image, which is generated by projecting appearance information of a geometric mesh structure modified on the basis of posture information on the skeletal structure onto the multi-viewpoint image, with the multi-viewpoint image, corrects the geometric appearance information according to an error therebetween, and estimates the appearance information of the 3D model.

The parametric controller 70 expresses the appearance motion of the dynamic object by modifying the mesh with respect to the motion of the skeletal structure.

The storage unit 80 stores motion information including at least one of a residual error in shape estimation, posture information on the skeletal structure, a texture map restored from the multi-viewpoint image, and control parameters.

The reproducer 90 reproduces the multi-viewpoint image of each frame on the basis of the motion information stored in the storage unit 80.

Figure 2:
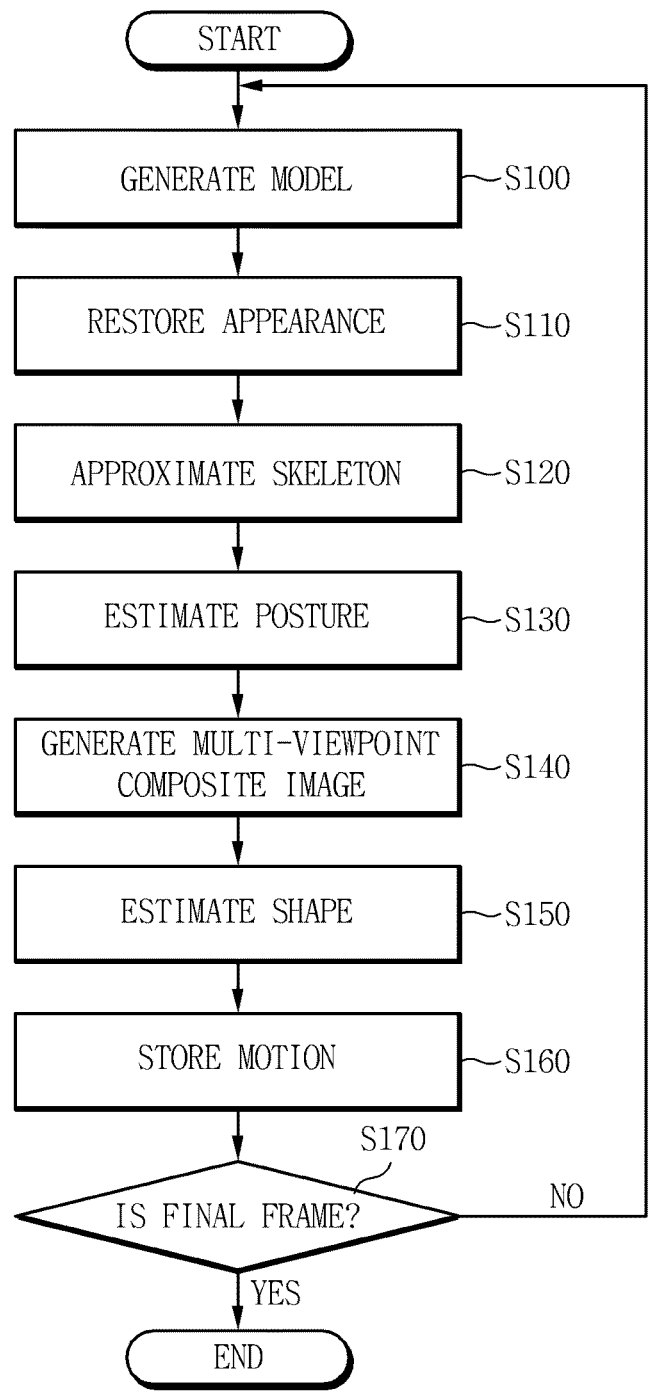
FIG. 2 is a flow chart illustrating processes of a method for capturing a motion of a dynamic object according to an exemplary embodiment of the present invention.

FIG. 2 is a flow chart illustrating processes of a method for capturing a motion of a dynamic object according to an exemplary embodiment of the present invention.

First, a process of generating a 3D model having an appearance modifiable through a motion control on the basis of anatomic features of an object input to a multi-viewpoint video image (S100) is performed. An example of the 3D model is a human body that is a representative dynamic object.

Figure 3:
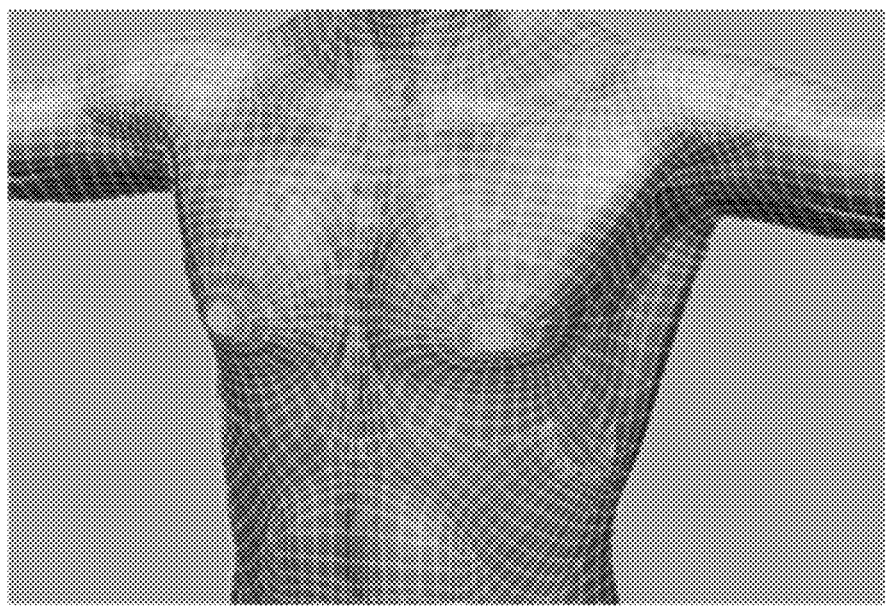
FIGS. 3 to 6 are exemplary views illustrating operation examples of a method for capturing a motion of a dynamic object according to exemplary embodiments of the present invention.
Figure 4:
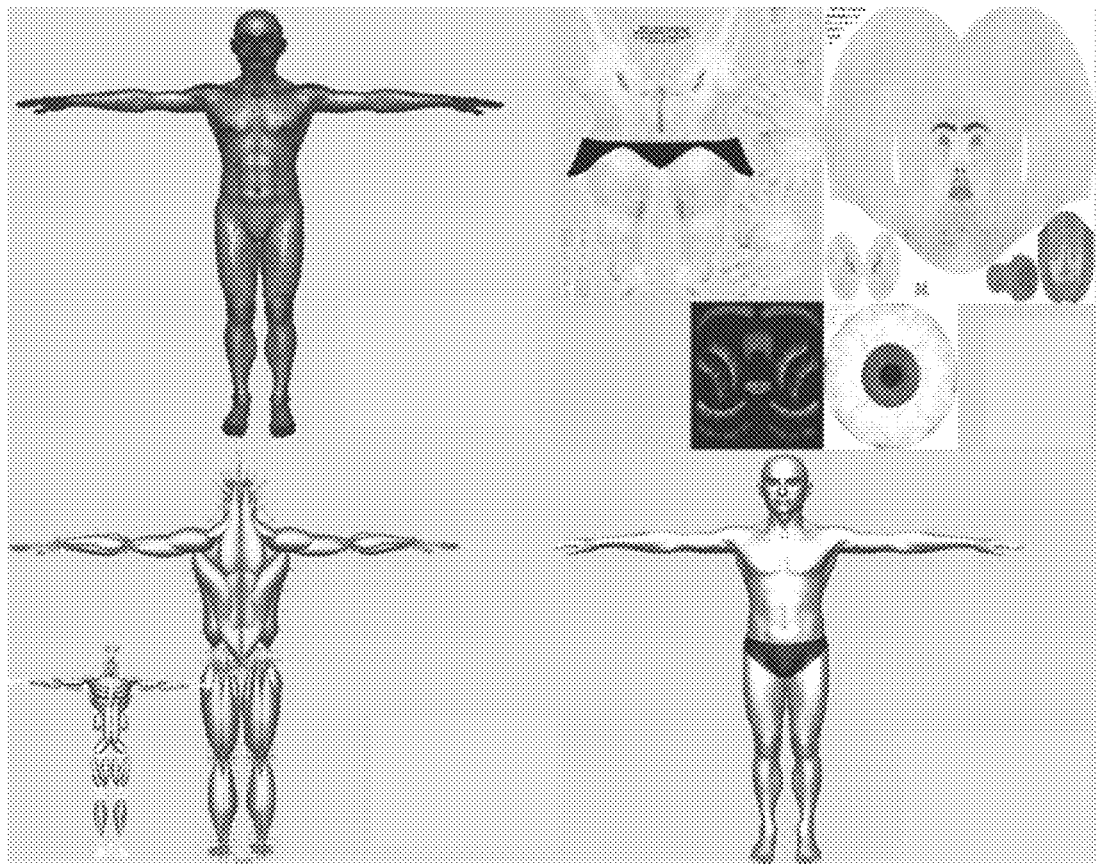

A human body structure as shown in FIG. 3 includes a texture map expressing a mapping relationship between a mesh structure expressing a geometric appearance of a dynamic object as shown in FIG. 4 and faces composed of individual vertexes in the mesh structure expressing a photometric appearance, a skeletal structure constructed on the basis of anatomic information on the dynamic object, a muscle structure subordinate to the skeletal structure, and a parametric controller 70 expressing an appearance motion of the dynamic object by modifying the mesh according to a motion of the skeletal structure, and has a feature that is capable of copying a modification of the appearance caused by a motion of the dynamic object by controlling rotations of joints constituting the skeletal structure of the dynamic object.

Figure 5:
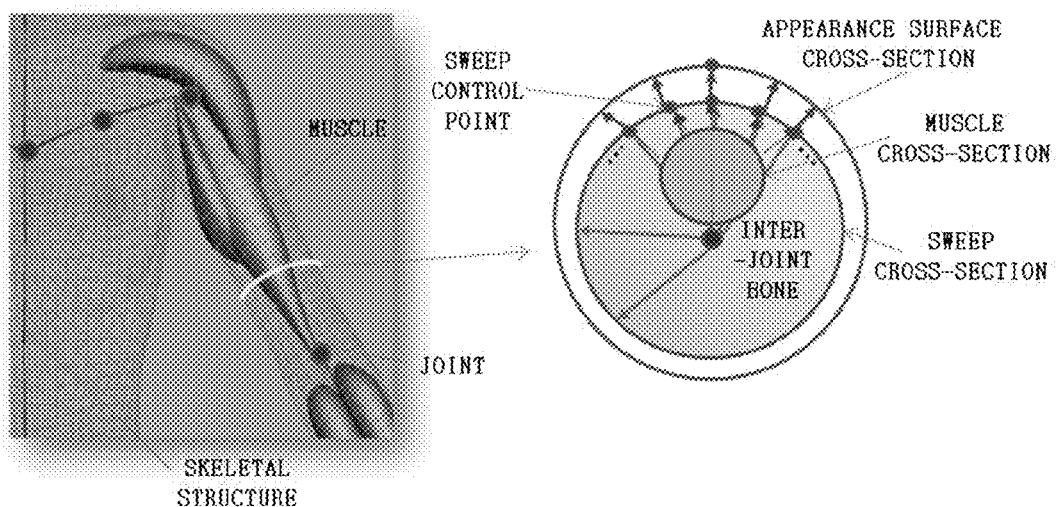

The parametric controller 70 generating an actual modification in the appearance modifies the geometric shape of the appearance caused by the motion through a series of processes including posture control by rotations of joints constituting the skeletal structure as shown in FIG. 5, contraction and relaxation of a muscle connected to the skeletal structure based on changed posture information, a modification in the global shape of a parametrically expressed sweep surface generated with contraction and relaxation of a muscle by posture information on the skeletal structure, a modification in a local shape of the sweep surface regarding muscles caused by contraction and relaxation of a muscle, and a modification in a surface determining positions of individual vertexes of the mesh structure regarding the sweep surface in a 3D space.

Input multi-viewpoint video images are acquired from multiple synchronized cameras and individual frames are the same as still images obtained by capturing a motion of the dynamic object at the same time point.

In an appearance restoring process (S110), an image portion of a subject that is to be subject to a motion capture is separated as a foreground from a multi-viewpoint image of a specific frame and a visual hull is obtained by a silhouette intersection method using 2D silhouette information corresponding to a foreground region of each camera and information on colors in the foreground.

Figure 6:
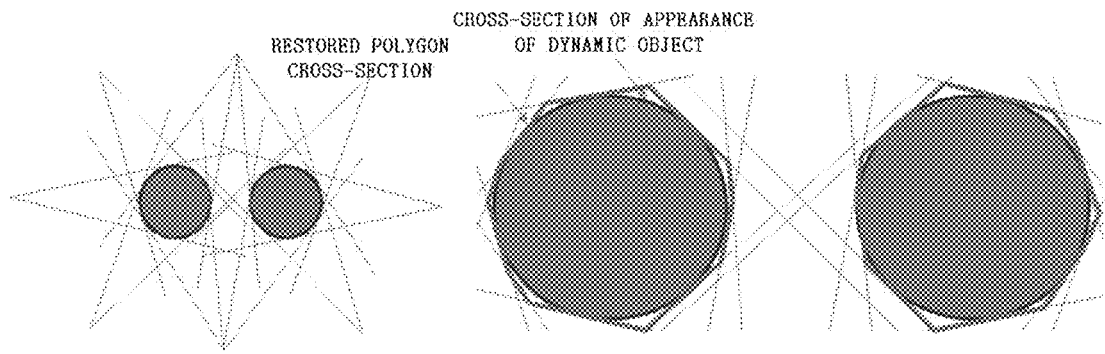

The obtained visual hull has a cross-sectional shape approximated to a polygon as shown in FIG. 6 when a restored 3D appearance, and has a feature that it necessarily internally includes actual 3D information corresponding to a corresponding cross-section of a 3D appearance of the dynamic object. Further, when a cross-section of a subject to be restored has a convex feature, each polygon of the cross section has a feature that an error between the polygon and the subject to be restored in a multi-viewpoint image is reduced according to the number of cameras in the multi-viewpoint image having visibility respect to the corresponding polygon. In order to use this feature for a motion capturing process, for every voxel constituting the restored visual hull, the corresponding voxel records information on the level of visibility.

Figure 7:
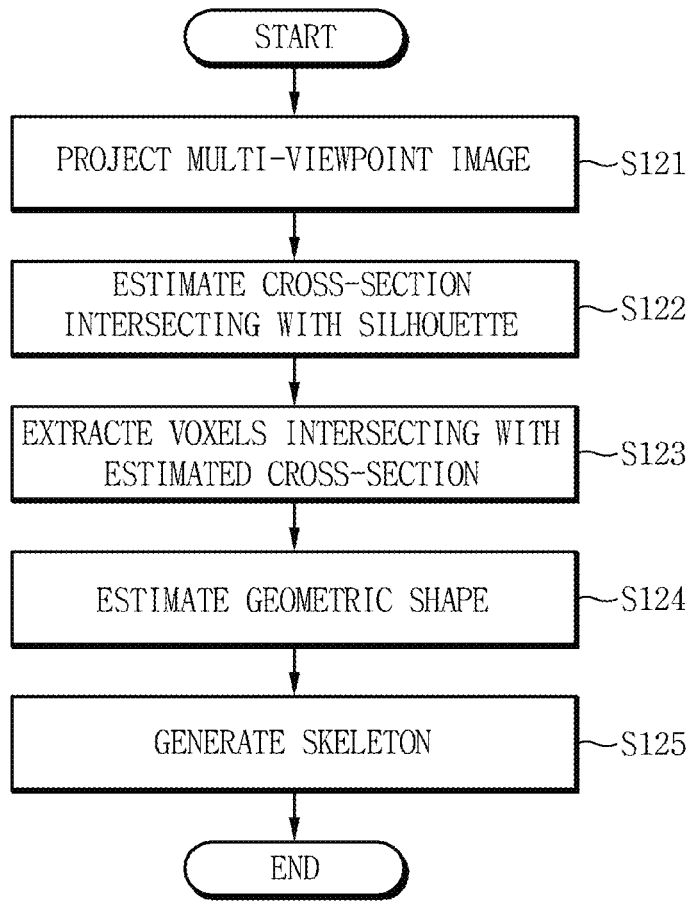
FIG. 7 is a flow chart illustrating an operational flow of a skeleton approximating process according to an exemplary embodiment of the present invention.

A skeleton approximation process (S120) is performed as shown in FIG. 7.

A skeleton best approximating geometric appearance information regarding a motion of a specific frame is extracted by using the visual hull obtained in the appearance restoring process and visibility information of individual voxels constituting the visual hull. For skeleton approximation, restored visual hull information is projected to the multi-viewpoint image (S121).

An exemplary embodiment regarding this will be described with reference to FIG. 8. As shown in FIG. 8, sampling is performed at predetermined intervals along a tangential line of a 2D silhouette of the projected multi-viewpoint image, 3D voxels intersecting with the 2D silhouette are extracted, and a 3D cross-section intersecting with the restored appearance at the shortest distance from the extracted voxels is estimated (S122). In this case, voxels intersecting the estimated cross-section is extracted (S123).

Further, a geometric shape (for example, a circle or an ellipse) of the subject to be restored on the 3D model corresponding to the corresponding cross-section is estimated by using the visibility information of the voxels intersecting the cross-section (S124), and an approximated skeleton regarding the whole body is generated by connecting central points of estimated shape models (S125).

The use of the visibility information of voxels and geometric shape models ensures the stability of skeleton estimation at an area in which two or more parts are jointed such as a shoulder.

Figure 9:
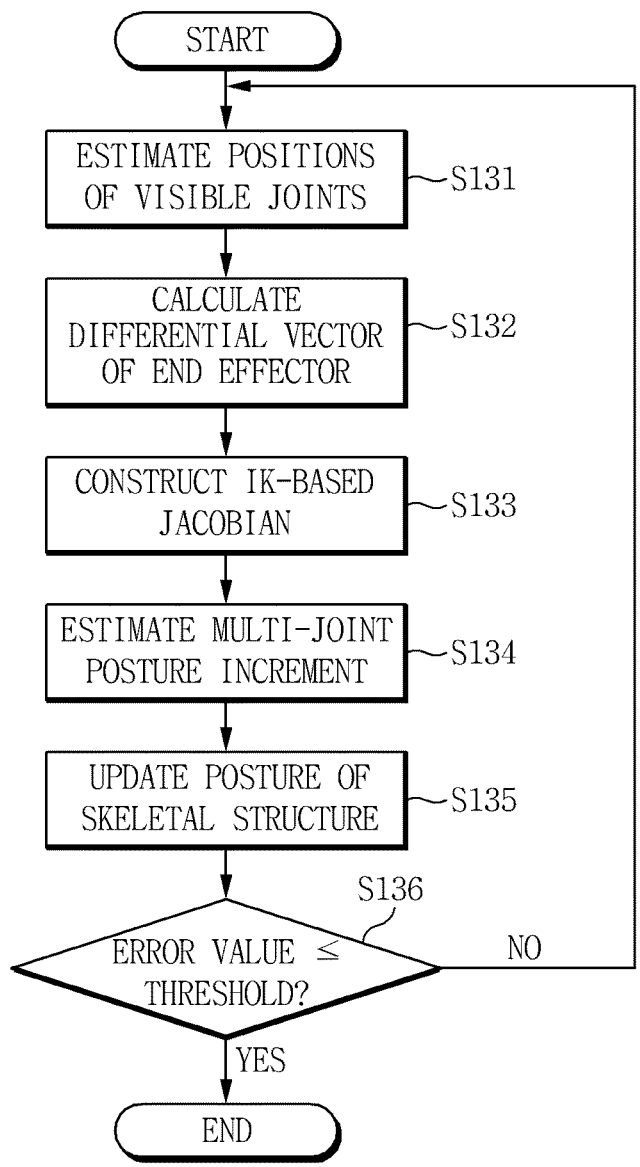
FIG. 9 is a flow chart illustrating an operational flow of a posture estimating process according to an exemplary embodiment of the present invention.

Meanwhile, a posture estimating process (S130) for receiving the approximated skeleton information regarding the specific frame of the multi-viewpoint video images and the 3D model information of the dynamic object and estimating postures of individual joints constituting the skeletal structure of the 3D model at the corresponding frame is performed. The detailed operation flow regarding this will be described with reference to FIG. 9.

The posture estimating process (S130) can estimate posture information on all joints of the whole body of the 3D model including joints having no visibility by calculating a Jacobian matrix based on inverse kinematics for the whole body by using joints, having visibility on the multi-viewpoint image, of the joints constituting the skeletal structure of the 3D model and information on joint positions on the skeleton corresponding thereto.

In order for visibility test of the multi-viewpoint image, appearance information of the 3D mode modified by posture information on the skeletal structure estimated at a previous frame of a frame to be subject to estimation of a current posture is projected to each multi-viewpoint image, and for each part, two or more joints close to an end effector of the corresponding part are first selected from among the joints of the skeletal structure of the 3D model by using visibility information of the cameras regarding the projected appearance.

Figure 10:
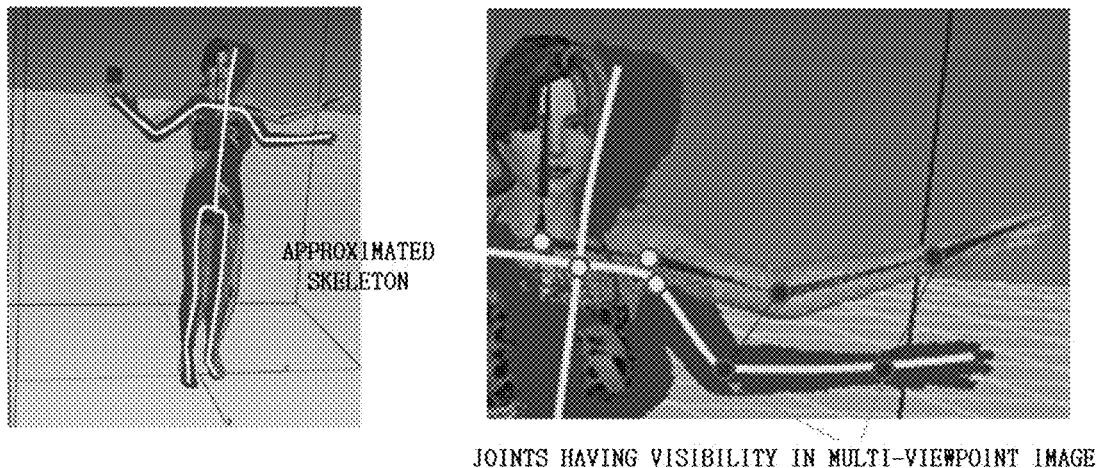
FIG. 10 is an exemplary view referred to for explaining a posture estimating process according to an exemplary embodiment of the present invention.

The information on the corresponding joint position on the skeleton with respect to a joint having visibility searched by the above approximates a skeleton curve, restored in the current frame by using length information between neighboring joints of the corresponding joint of the 3D model and the posture information of the skeletal structure of the 3D model restored in the previous frame of the frame being subject to restoration, to a 3D polygon line maintaining a joint length as shown in FIG. 10, thereby estimating a joint position corresponding to each joint of 3D model (S131).

A differential vector e between a 3D position of a joint having visibility in the previous frame and a 3D position on the skeleton corresponding to each joint in the current frame is calculated (S132), and a Jacobian matrix J is constructed by using posture information on each joint of the skeletal structure of the previous frame and information on a 3D position of an end effector joint having visibility (S133).

If the Jacobian matrix is multiplied by a total posture value vector r obtained by adding a position value increment to the current frame to position values of all joints of the skeletal structure of the previous frame, the result becomes equal to the differential vector.

However, since a posture estimating process (S134) is a process of finding a posture value vector, when a pseudo inverse matrix of the Jacobian matrix is calculated and is multiplied by the different vector, it is possible to obtain the posture value vector (S135).

Through the series of processes mentioned above, the posture information of the dynamic object of the current frame in the process (S135) can be expressed as posture information on the joints constituting the skeletal structure of the 3D model.

Next, 3D positions of individual vertexes of the mesh structure expressing the geometric appearance of the 3D model can be calculated through the parametric controller 70 of the 3D model by using the estimated posture information.

The multi-viewpoint composite image generation process (S140) may project the shape information modified through the parametric controller 70 to the multi-viewpoint image by using geometric calibration information of the multiple cameras, and estimate a color value of a texture map of each mesh by using the visibility information of the projected mesh structure of each camera. When a texture map estimated through the multi-viewpoint image of the corresponding frame is rendered in each camera again by using the visible information of each mash, a multi-viewpoint composite image can be generated.

A shape estimating process (S150) is a process of estimating the 3D positions of individual vertexes on the mesh structure of the 3D model by using information on a color reproduction error and a 2D silhouette error between the multi-viewpoint composite image obtained in the above-mentioned composite image generating process and the input multi-viewpoint image.

Figure 11:
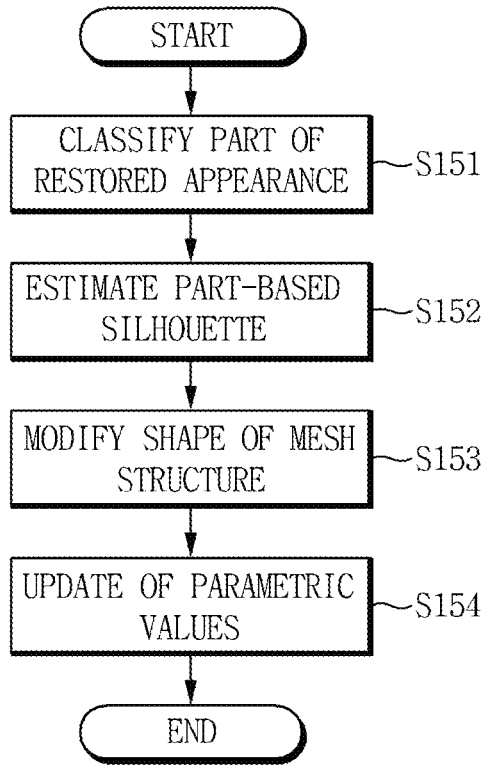
FIG. 11 is a flow chart illustrating an operational flow of a shape estimating process according to an exemplary embodiment of the present invention.

The detailed description thereof is made with reference to FIG. 11. In the shape estimating process, voxel appearance information restored to improving the degree of precision of the geometric appearance restoration is classified to part information for each of the multiple end effectors such as an arm and a leg of a human body estimated in the posture estimating process (S151), 2D silhouette information lost by self-occlusion is estimated by extracting image color edge information close to the boundary of part information projected to the multi-viewpoint image and having similar normal line information (S152), and the shape is modified to minimize the silhouette error of the multi-viewpoint image found (S153)

Further, a position of a vertex maximally ensuring the curved surface information of a unique tangent line direction of each vertex while minimizing the color error is estimated by generating radiation lines from the central point of the 3D cross-section including vertexes of the mesh structure of the 3D model to the individual vertexes, and performing template matching to the boundary of the 3D visual hull along the radiation lines projected to the multi-viewpoint image having visibility.

Parameter values are controlled by changing control parameters of a sweep model and muscles of the parametric controller 70 in the 3D model by using the appearance information of the 3D model obtained through the above-mentioned two processes to minimize the 3D directional error component with respect to the 3D position of each vertex of the 3D model restored through the shape estimating process and the position of each vertex of the 3D model modified through the parametric controller 70 (S154), such that the parametric controller 70 of the 3D model can better express the motion information of the dynamic object later.

Finally, a motion storing process (S160) stores the posture information of the skeletal structure estimated through the posture estimating process (S130), the parameter information of the parametric controller 70, residual 3D directional error components of individual vertexes of the mesh structure remaining in the shape estimating process (S150), and the texture information obtained by using the visibility of the multi-viewpoint image regarding the restored appearance information.

The motion storing process (S160) has an advantage capable of reproducing the multi-viewpoint image of the corresponding frame by using minimum storage information and has a feature that can generate the same multi-viewpoint image by storing or transmitting a required amount of motion storage values without storing or transmitting a large amount of multi-viewpoint video image.

It is possible to capture a motion of a dynamic object by using only multi-viewpoint video images without a separate marker or motion capture apparatus.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Accordingly, the actual technical protection scope of the present invention must be determined by the spirit of the appended claims.

What is claimed is:

1. A method for capturing a motion of a dynamic object, comprising:
   generating a 3D model of the dynamic object based on the anatomic features of the dynamic object and multi-viewpoint video images of a motion of the dynamic object;
   restoring geometric appearance information of the 3D model with respect to the motion of the dynamic object from each frame of multi-viewpoint images extracted from the multi-viewpoint video images;
   approximating a 3D skeleton with respect to the motion of the frame by using visibility information of each voxel constituting a visual hull obtained from the geometric appearance information of the 3-D model;
   receiving the 3D skeleton information and 3D model information of the dynamic object to estimate a posture of the 3D model on the basis of position information of individual joints constituting a skeletal structure of the 3D model in a corresponding frame; and
   estimating the shape of the 3D model by comparing a multi-viewpoint composite image, generated by projecting appearance information of a geometric mesh structure modified on the basis of posture information of the skeletal structure to the multi-viewpoint image, with the multi-viewpoint image and calibrating the geometric appearance information according to an error therebetween.

2. The method for capturing a motion of a dynamic object according to claim 1, wherein the 3D model includes:
   a mesh structure expressing a geometric appearance and a texture map expressing a photometric appearance;
   the skeletal structure of the 3D model constructed on the basis of anatomic information of the dynamic object; and
   a muscle structure subordinate to the skeletal structure.

3. The method for capturing a motion of a dynamic object according to claim 2, wherein the 3D model maintains a shape on the basis of the skeletal structure of the 3D model, and makes a modification in the shape and a motion through rotations of inferior joints constituting the skeletal structure and contraction and relaxation of the muscle structure expressed on the basis of anatomy between joints.

4. The method for capturing a motion of a dynamic object according to claim 2, further comprising:
   storing motion information including at least one of a residual error of shape estimation in the estimating the shape, the posture information of the skeletal structure of the 3D model, a texture map restored from the multi-viewpoint image, and control parameter values.

5. The method for capturing a motion of a dynamic object according to claim 4, further comprising:

reproducing the multi-viewpoint image of the each frame on the basis of the motion information stored in the storing the motion information.

6. The method for capturing a motion of a dynamic object according to claim 1, wherein the approximating includes:
  projecting the restored geometric appearance information to the multi-viewpoint image;
  performing sampling at predetermined intervals along a tangent line of a 2D silhouette of the multi-viewpoint image to which the geometric appearance information has been projected, and extracting 3D voxels intersecting with the 2D silhouette;
  generating a 3D cross-section including the extracted 3D voxels and intersecting with restored appearance information at the shortest distance; and
  generating the skeleton by connecting the centers of gravity of the 3D voxels intersecting with the generated 3D cross-section.

7. The method for capturing a motion of a dynamic object according to claim 1, wherein the estimating the posture further includes estimating a joint position corresponding to each joint of the 3D model by approximating a skeleton curve restored in a current frame to a 3D polygon line maintaining a joint length by using inter-joint length information of the 3D model and posture information on the skeletal structure of the 3D model restored in the previous frame of the current frame being subject to restoration.

8. The method for capturing a motion of a dynamic object according to claim 1, wherein the estimating the posture includes:
  calculating a Jacobian matrix on the basis of whole body inverse kinematics by using joints, having visibility in the multi-viewpoint image, of joints constituting the skeletal structure of the 3D model and joint position information on the 3D skeleton corresponding thereto, and
  estimates posture information of all joints of the 3D model including joints having no visibility by using the Jacobian matrix.

9. The method for capturing a motion of a dynamic object according to claim 8, wherein in the calculating of the Jacobian matrix, the whole body inverse kinematics calculates Jacobian matrix with respect to joint motions of a whole body by using all 3D corresponding points having visibility in three points or more multi-viewpoint images with respect to each end effector in reference to a root of forward kinematics of the dynamic object.

10. The method for capturing a motion of a dynamic object according to claim 9, wherein the estimating the posture further includes estimating whole body joint motions to minimize differential vectors of the 3D corresponding points while maintaining the restriction condition of an anthropometric joint rotation angle.

11. The method for capturing a motion of a dynamic object according to claim 1, wherein the estimating the shape includes:
  classifying appearance information of the 3D voxels restored according to part information of the dynamic object;
  estimating 2D silhouette information lost by self-occlusion by extracting color edge information, close to the boundary of part information projected to the multi-viewpoint image and included in image having similar normal line information; and
  modifying the shape to minimize a silhouette error of the multi-viewpoint image.

12. The method for capturing a motion of a dynamic object according to claim 1, wherein the estimating the shape further includes estimating a position of a vertex maximally ensuring the curved surface information of a unique tangent line direction of each vertex while minimizing the color error by generating radiation lines from the central point of the 3D cross-section including vertexes of the mesh structure of the 3D model to the vertexes, and performing template matching to the boundary of the 3D visual hull along the radiation lines projected to the multi-viewpoint image having the visibility.

13. The method for capturing a motion of a dynamic object according to claim 1, wherein the estimating the shape includes:
  controlling a posture by rotations of joints constituting the skeletal structure;
  performing contraction and relaxation of muscles connected to the skeletal structure on the basis of the posture information;
  modifying a global shape of a sweep surface parametrically expressed by the posture information of the skeletal structure;
  modifying a local shape of the sweep surface connected to the muscles by the contraction and relaxation of the muscles; and
  modifying a surface of each vertex of a mesh structure connected to the sweep surface.

14. An apparatus for capturing a motion of a dynamic object, comprising:
  a 3D model generator generating a 3D model of the dynamic object on the basis of anatomic features of the dynamic object;
  an appearance information restoring unit restoring geometric appearance information of the 3D model with respect to a motion of the dynamic object from each frame of multi-viewpoint images extracted from multi-viewpoint video images;
  a skeleton approximating unit approximating a 3D skeleton with respect to a motion of the frame from the geometric appearance information;
  a posture estimating unit estimating a posture of the 3D model on the basis of position information of individual joints constituting a skeletal structure of the 3D model in the corresponding frame; and
  a shape estimating unit estimating a shape of the 3D model according to an error between the multi-viewpoint image and a multi-viewpoint composite image generated by projecting appearance information of a geometric mesh structure modified on the basis of posture information of the skeletal structure.

15. The apparatus for capturing a motion of a dynamic object according to claim 14, further comprising:
  a parametric controller expressing a motion of an appearance of the dynamic object by modifying the mesh structure corresponding to a motion of the skeletal structure.

16. The apparatus for capturing a motion of a dynamic object according to claim 14, further comprising:
  a storage unit storing motion information including at least one of a residual error of shape estimation, the posture information of the skeletal structure, a texture map restored from the multi-viewpoint image, and control parameter values.

17. The apparatus for capturing a motion of a dynamic object according to claim 16, further comprising:
  a reproducer reproducing the multi-viewpoint image of the each frame on the basis of the motion information stored in the storage unit.

* * * * *